March 2, 1926.

N. P. COLLIS 1,575,414

DESICCATING APPARATUS

Filed Jan. 14, 1922

Inventor:
Norman P. Collis.
By
Attys.

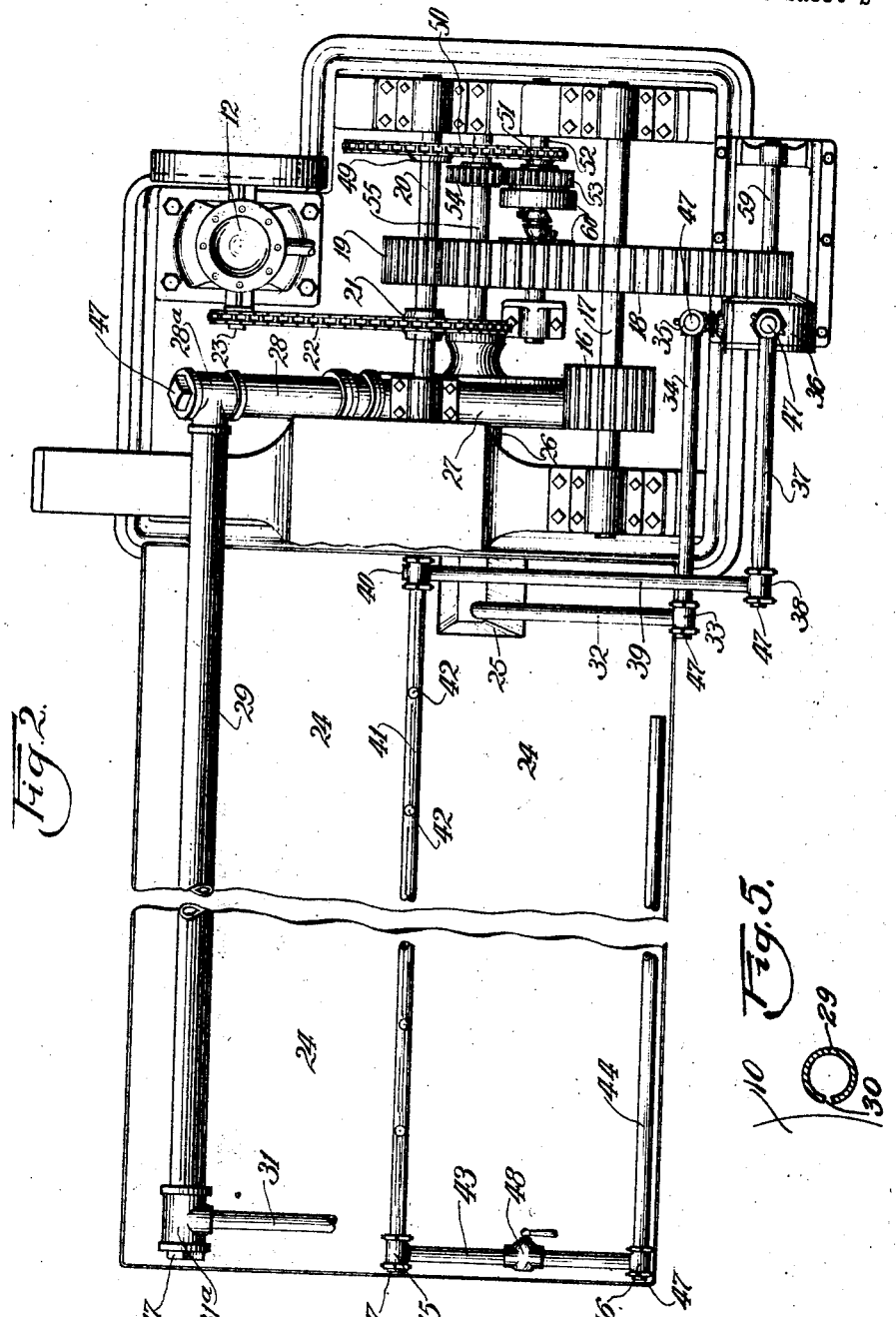

March 2, 1926.
N. P. COLLIS
1,575,414
DESICCATING APPARATUS
Filed Jan. 14, 1922    3 Sheets-Sheet 3
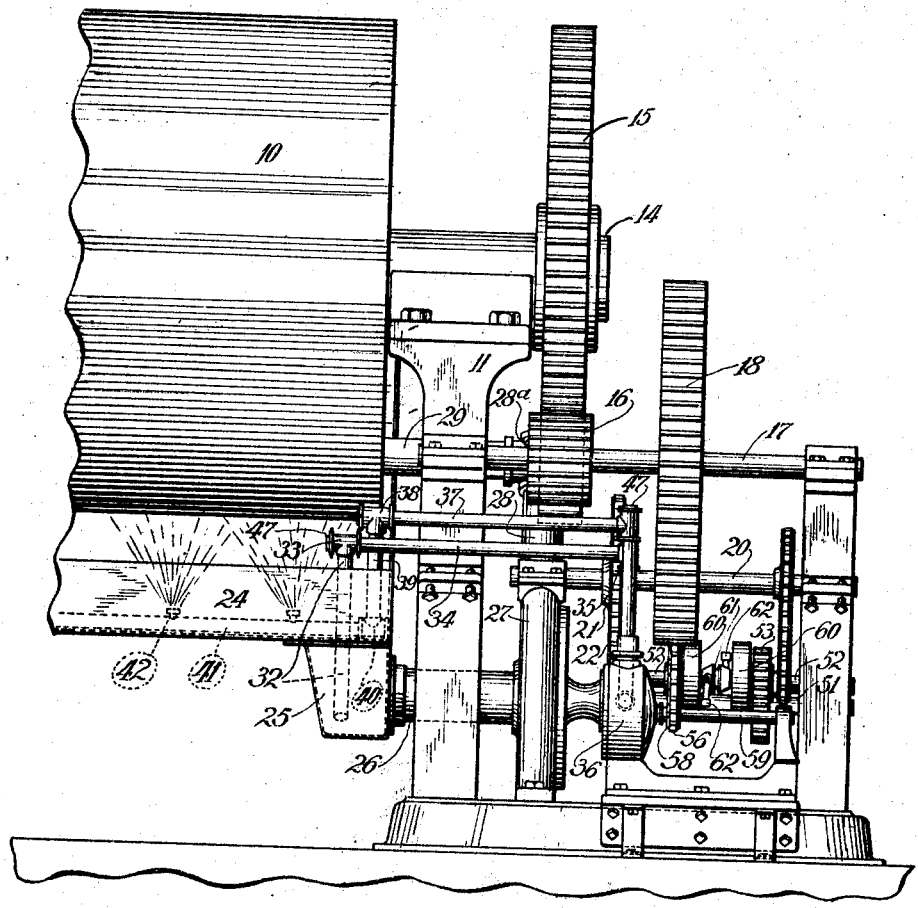
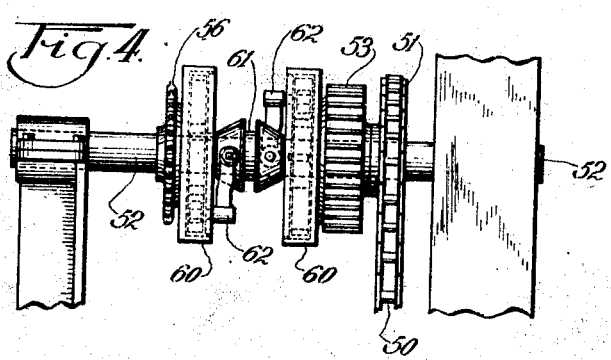

Patented Mar. 2, 1926.

1,575,414

UNITED STATES PATENT OFFICE.

NORMAN P. COLLIS, OF ST. PAUL, MINNESOTA, ASSIGNOR TO THE COLLIS COMPANY, OF CLINTON, IOWA, A CORPORATION OF IOWA.

DESICCATING APPARATUS.

Application filed January 14, 1922. Serial No. 529,224.

*To all whom it may concern:*

Be it known that I, NORMAN P. COLLIS, a citizen of the United States, residing at St. Paul, in the county of Ramsey and State of Minnesota, have invented certain new and useful Improvements in Desiccating Apparatus, of which the following is a specification.

The apparatus of this invention is designed with especial reference to the drying requirements of both sweet milk and buttermilk, and with a view to permitting the machine to desiccate either of these substances as occasion may require; and with this end in view provision is made for the employment of a heated drum common to the milk drying and buttermilk drying instrumentalities, which latter, however, are separate and distinct from one another, although so arranged that either may be called into service, depending upon the use intended for the time being.

Sweet milk and buttermilk are quite different in their physical properties, so that the means employed for delivery to the heated roller differ quite markedly in the two cases. Sweet milk is a substantially homogeneous substance, having practically all the solids in solution, so that it may be delivered in the form of a finely divided spray to the roller without danger of clogging the spray nozzles, while buttermilk, on the contrary, is composed of liquid whey, which contains the sugars and certain of the mineral constituents in solution, and also the curd, which comprises the casein and other solids in suspension, so that provision must be made, when buttermilk is being dried, to thoroughly agitate the mixture of liquids and solids and deliver the same to the heated roll in a finely divided condition. These differences in the physical properties of the two substances necessitate the use of special equipment for the handling of each, and the present invention is designed to meet the conditions stated.

In the drawings:

Fig. 2 is a top or plan view with the center portion broken out and with the heating drum removed;

Fig. 3 is a side elevation showing one end of the machine;

Fig. 4 is a detail of the clutch for throwing into train either the milk or buttermilk delivery mechanism, as the case may be, and Fig. 5 is a fragmentary detail showing the discharge slot in the header pipe.

Figure 1:
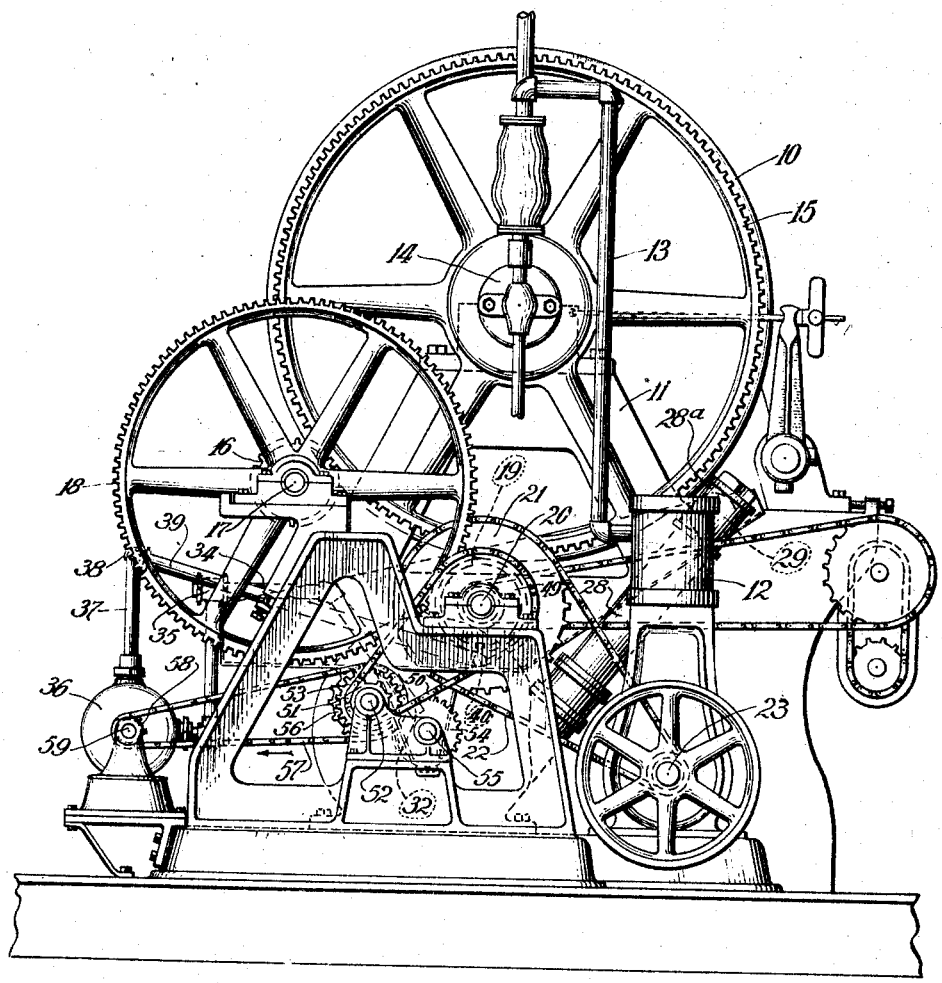
Figure 1 is an end view of the machine embodying the features of the present invention.

The apparatus comprises a drying drum or cylinder 10 which is journalled in the top of a frame 11, and adapted to be heated by steam delivered from the engine 12 through a pipe 13, or from any other source of supply. The drum is mounted upon a shaft 14 which is provided with a spur gear 15 meshing with a spur pinion 16 mounted upon a shaft 17 which carries a transmission gear 18 in mesh with a transmission pinion 19 mounted upon a transmission shaft 20, which shaft is provided with a sprocket wheel 21 engaged by a sprocket chain 22, which transmits the power derived from the engine shaft 23. This gear transmission arrangement is one which serves to transform the relatively high speed of rotation of the engine shaft into a slow speed of rotation for the heating drum so that sufficient time will be afforded during one complete revolution of the drum to heat and dry the volume of liquid delivered thereto, and adhering thereon.

Below the drum is located a pan 24 provided at one end with a depending trough 25, which trough communicates with the buttermilk intake pipe 26 entered into a rotary pump 27. The pump ejects the buttermilk through an obliquely disposed delivery pipe 28 which connects through an elbow 28ª with a cross header 29 running parallel with the drying surface of the drum and at a point distant about 45° from the vertical plane of the drum, as well indicated in Fig. 1.

The horizontal header pipe 29 is provided with one or more elongated slots 30 on the side adjacent to the drum, which slots are designed to eject a thin film or sheet of buttermilk onto the surface of the rotating drum, the cross dimensions of the slot or slots being sufficiently large to avoid clogging due to the somewhat coarse texture of the buttermilk and the presence therein of finely divided or comminuted particles of insoluble solids held in suspension within the liquid whey. Any excess of buttermilk delivered through the heater pipe is discharged back into the pan through a return pipe 31 connected by an elbow 31ª located near the end wall of the pan distant from the point of ingress for the buttermilk, so that under ordinary conditions a circulation of buttermilk will be maintained through the pan by the suction of the pump at the near end thereof and the delivery of the returned buttermilk at the far end, which circulation assists in preventing a precipitation of the solid particles, so that the buttermilk in the pan is maintained in agitated condition, which agitation is further augmented and the particles more finely divided by the passage of the buttermilk through the pump and through the pipes up to the point of delivery.

When it is desired to utilize the drum for the drying of sweet milk, the following mechanism is employed. The sweet milk in the pan 24 is drawn in through a pipe 32, the inlet end of which is located in close proximity to the trough 25 and is connected by means of an elbow 33 to a pipe section 34, which is connected by an elbow 35 to a pump 36, from which the sweet milk is ejected through a pipe 37 connected by means of an elbow 38 with a cross pipe 39 connected by an elbow 40 with a spray pipe 41 provided with suitably spaced nozzles 42. The spray pipe 41 occupies a position in the bottom of the pan at a point immediately below the drum, and is adapted to deliver the sweet milk to the drum in the form of finely divided spray; any excess being delivered back into the pan through pipe sections 43—44 connected by elbows 45—46, as indicated in Fig. 2.

The pipe for the delivery of sweet milk is of relatively smaller diameter than the pipe for the delivery of the buttermilk, since the sweet milk is free from suspended particles which might tend to clog up the pipe system. All of the elbows, both for the supply of buttermilk and sweet milk, are provided with plugs 47 which may be easily removed, so that the interior of the pipe system may be readily cleaned out as occasion may require. The return pipe 43 for the sweet milk is provided with a valve 48, which may be adjusted as desired to regulate the pressure available for forcing the sweet milk through the spray nozzles under the action of the pump.

In order to operate either of the delivery systems above described, from the same source of power, the following mechanism is provided: The shaft 20, which derives power directly from the engine, is provided with a clutch sprocket 49 which carries a sprocket chain 50, which engages a sprocket wheel 51 on a clutch shaft 52. The clutch shaft is constantly driven at a speed commensurate with the speed of rotation of the drying drum, and has loosely mounted thereon a gear 53 which meshes with a gear 54 on a buttermilk pump shaft 55, and the clutch shaft has also loosely mounted thereon a sprocket 56 which engages a sprocket chain 57 leading to a sprocket 58 upon the pump shaft 59 for the sweet milk pump 36. Between the buttermilk pump gear 53 and the sweet milk sprocket wheel 56 are located a pair of loosely mounted driven clutch members 60, as best shown in Fig. 4, one connected with the gear and the other connected with the sprocket wheel. Interposed between the driven clutch members is a shiftable driving clutch member 61 splined or otherwise secured in fixed rotating relation to the constantly driven shaft 52. The driving clutch member is provided with oppositely disposed clutch elements 62, one for each of the driven clutch members, either of which elements is adapted to be brought into action with the corresponding driven clutch element, by the longitudinal movement of the driving clutch member on the constantly rotating shaft.

Suitable means are provided for removing the dry product from the heated drum, but the use of such a device is well understood and is not special to the present invention. In use, with the engine operating, the drying drum will be constantly rotated at a slow rate of speed and in a clockwise direction, as viewed in Fig. 1. When it is desired to desiccate buttermilk, the same is delivered in sufficient quantity to the pan beneath the drum and the clutch thrown to engage the transmission mechanism for the buttermilk pump, so that the buttermilk will be sucked out from the bottom of the pan and finely divided during its passage through the slot or slots in the buttermilk header pipe, being projected onto the drum in the form of a thin stream or film, the excess flowing back into the pan to be recirculated as before.

When it is desired to dry sweet milk, the pan is cleaned of any residue of buttermilk, and sweet milk introduced and the clutch thrown into position to disengage the buttermilk pump transmission mechanism and to engage the sweet milk pump transmission mechanism. The sweet milk, being in the form of a homogeneous liquid, may be delivered through much finer nozzles and in a much more finely divided condition to the drum, and in view of these circumstances it is feasible to locate the sweet milk spray nozzles at a point on the drum more advanced toward the scraping or cutting point than in the case of the buttermilk. In view of these circumstances, the sweet milk nozzles are located immediately beneath the drum, so that a less period of rotation is available for drying purposes, but this circumstance is compensated by the quicker drying of the sweet milk and by the fact that a lesser period of heating is desirable in order to avoid burning or a transformation of soluble into insoluble constituents, which immediately follow the application of an excessive amount of heat. Of course, the degree of heat imparted to the drum can be regulated to best meet the requirements of either of the liquids under treatment and with due regard to the intended characteristics of the completed product.

I claim:

1. In a combined desiccating apparatus of the character indicated, the combination of a rotatably mounted heating drum, means for constantly rotating the heating drum, a delivery pipe having a relatively coarse aperture in proximity to the drum, pump mechanism for delivering a non-homogeneous liquid containing suspended solid particles to said delivery pipe, a second delivery pipe having relatively fine delivery apertures in proximity to a different portion of the drum, a pump for supplying the second delivery pipe with a watery homogeneous liquid, means for constantly rotating the drum, separate transmission mechanisms for each of the pumps, and means associated with the drum rotating means for imparting operating movements to either of the pumps, substantially as described.

2. In a combined desiccating apparatus of the character indicated, the combination of a rotatably mounted heating drum, means for constantly rotating the heating drum, a delivery pipe having a relatively coarse aperture in proximity to the drum, pump mechanism for delivering a non-homogeneous liquid containing suspended solid particles to said delivery pipe, a second delivery pipe having relatively fine delivery apertures in proximity to a different portion of the drum, a pump for supplying the second delivery pipe with a watery homogeneous liquid, means for constantly rotating the drum, separate transmission mechanisms for each of the pumps, a clutch element associated with the drum rotating means, separate transmission means for each of the pumps, said transmission means each including a clutch element adapted to be engaged with the first mentioned clutch element for imparting power to either of the pumps, substantially as described.

3. In a combined desiccating apparatus of the character indicated, the combination of a rotatably mounted drum, a pan located beneath the drum, a header pipe for thickened liquids provided with a relatively coarse aperture, a pump for said header pipe, a connection leading from the pan to the pump, a connection leading from the header pipe back to the pan, a second pump for supplying a thin watery liquid to a different portion of the drum, a header pipe leading from the second pump to a point adjacent to the drum and provided with finely apertured nozzles, a supply pipe leading from the pan to the second pump, a return pipe leading from the second header to the pan, means for rotating the drum, and separate transmission mechanisms for the respective pumps, either of which is adapted to be engaged with the drum rotating means, substantially as described.

4. In a combined desiccating apparatus of the character indicated, the combination of a rotatably mounted drum, a pan located beneath the drum, a header pipe for thickened liquids provided with a relatively coarse aperture, a pump for said header pipe, a connection leading from the pan to the pump, a connection leading from the header pipe back to the pan, a second pump for supplying a thin watery liquid to a different portion of the drum, a header pipe leading from the second pump to a point adjacent to the drum and provided with finely apertured nozzles, a supply pipe leading from the pan to the second pump, a return pipe leading from the second header to the pan, means for rotating the drum, a separate transmission mechanism for each of the pumps, each transmission mechanism including a driven clutch element, and a common driving clutch element associated with the drum rotating means and adapted to be engaged with either of the driven clutch elements, substantially as described.

5. In a combined drying apparatus of the character specified, the combination of a rotatably mounted drying drum, a first header pipe provided with relatively coarse apertures and located in parallel relation to the drum at a point elevated above the lowermost surface of the drum, a second header pipe provided with relatively fine apertures located in parallel relation to and below the lowermost surface of the drum, a pump for the first header pipe, a pump for the second header pipe, means for rotating the drum, separate transmission mechanisms for each of the pumps, and means for imparting power to either of the pumps, substantially as described.

6. In a combined drying apparatus of the character specified, the combination of a rotatably mounted drying drum, a first header pipe provided with relatively coarse apertures and located in parallel relation to the drum at a point elevated above the lowermost surface of the drum, a second header pipe provided with relatively fine apertures located in parallel relation to and below the lowermost surface of the drum, a pump for the first header pipe, a pump for the second header pipe, means for rotating the drum, separate transmission mechanisms for each of the pumps, means for imparting power to either of the pumps, and means for engaging either of said transmission mechanisms with the drum rotating means, substantially as described.

7. In a combined drying apparatus of the character specified, the combination of a rotatably mounted drying drum, a first header pipe provided with relatively coarse apertures and located in parallel relation to the drum at a point elevated above the lowermost surface of the drum, a second header pipe provided with relatively fine apertures located in parallel relation to and below the lowermost surface of the drum, a pump for the first header pipe, a pump for the second header pipe, means for rotating the drum, separate transmission mechanisms for each of the pumps, means for imparting power to either of the pumps, a pan located beneath the drum, and separate supply pipes, one for each of the pumps, leading from said pan, substantially as described.

8. In a combined drying apparatus of the character specified, the combination of a rotatably mounted drying drum, a first header pipe provided with relatively coarse apertures and located in parallel relation to the drum at a point elevated above the lowermost surface of the drum, a second header pipe provided with relatively fine apertures located in parallel relation to and below the lowermost surface of the drum, a pump for the first header pipe, a pump for the second header pipe, means for rotating the drum, separate transmission mechanisms for each of the pumps, means for entraining either of said transmission mechanisms with the drum rotating means, a pan located beneath the drum, and separate supply pipes, one for each of the pumps, leading from said pan, substantially as described.

NORMAN P. COLLIS.